Patented Feb. 14, 1950

2,497,825

UNITED STATES PATENT OFFICE 2,497,825

METHOD OF MAKING 2-AMINO-5-SUBSTITUTED-1,3,4-THIADIAZOLE

George W. Steahly, St. Louis, Mo., assignor to Monsanto Chemical Company, St. Louis, Mo., a corporation of Delaware No Drawing. Application June 28, 1946,
Serial No. 680,077

19 Claims. (Cl. 260—302)

This invention relates to 1,3,4-thiadiazoles and more particularly to an improved method of making 2-amino-5-substituted-1,3,4-thiadiazoles. 2 - Amino - 5 - substituted - 1,3,4 - thiadiazoles are generally prepared by condensing an acyl chloride with an excess of thiosemicarbazide. The yields by this process are relatively low, ranging from approximately 30% to approximately 45%. Certain 2-amino-1,3,4-thiadiazoles having a substituent in the 5-position, for example, alkyl, alkenyl, aralkyl and cycloalkyl radicals have been found useful as analgesic agents. Certain of the 2-sulfanilyl derivatives of 2 - amino - 5 - substituted - 1,3,4 - thiadiazoles, for example the 5-alkyl and 5-alkenyl derivatives having from 2 to 4 carbon atoms in the alkyl and alkenyl radicals and the 5-cycloalkyl derivatives, have been found to be strikingly active as anti-bacterial agents. The low yields obtained by the usual process of preparing the thiadiazoles renders the manufacturing cost of these compounds relatively high and it is most desirable that a method be found which will reduce the manufacturing cost by providing better yields of the desired compounds.

According to the method of the present invention, generally stated, substantially improved yields of 2 - amino - 5 - substituted - 1,3,4 - thiadiazoles may be obtained by condensing one equivalent of an acyl chloride with one equivalent of thiosemicarbazide in the presence of one equivalent of a condensing agent of the type illustrated by phosphorus chlorides, such as phosphorus trichloride, phosphorus bromides, such as phosphorus oxybromide, and thionyl chloride, rendering the reaction mixture alkaline and recovering the 2-amino-5-substituted-1,3,4-thiadiazole from the reaction mixture. The reaction is exothermic; however, in some instances it may be desirable to add heat during the course of the reaction and in other instances it may be desirable to apply external cooling to control the reaction within safe limits. The method of this invention makes possible substantially improved yields of 2-amino-5-substituted-1,3,4-thiadiazoles.

The condensing agents suitable for the purpose of the present invention are thionyl chloride, thionyl bromide, chlorosulfonic acid, sulfur monochloride, sulfur monobromide, chlorides of phosphorus as phosphorus trichloride, phosphorus pentachloride, and phosphorus oxychloride, and, bromides of phosphorus as phosphorus tribromide, phosphorus pentabromide and phosphorus oxybromide.

In a special embodiment of the process of the present invention in the preparation of 2-amino-5-alkenyl-1,3,4-thiadiazoles by this process, one equivalent of a chloralkanoyl chloride is condensed with one equivalent of thiosemicarbazide in the presence of one equivalent of a condensing agent selected from those described in the preceding paragraph. In the operation of this embodiment of the process, the reactants are mixed and warmed to initiate the reaction. The reaction is complete when the evolution of hydrogen chloride has ceased. External cooling may be found necessary to control the rate of reaction. Following this, the reaction mixture may be processed by any desirable procedure for the recovery of the 2-amino-5-alkenyl-1,3,4-thiadiazole. For example, the reaction mixture may be dissolved in water and hydrolyzed with alkali to remove hydrogen chloride from the 2 - amino - 5 - chloroalkyl - 1,3,4 - thiadiazole hydrochloride and to liberate the free base. The free base thereupon precipitated from the solution on cooling may be filtered off, washed with water and dried.

The following examples will serve to illustrate the novel process of the present invention. These examples are to be construed merely as illustrative and not as limiting the invention except as defined in the appended claims.

EXAMPLE I

2-amino-5-ethyl-1,3,4-thiadiazole

A mixture of 9.2 g. (0.1 mole) of propionyl chloride, 9.1 g. (0.1 mole) of thiosemicarbazide and 5.5 g. (0.04 mole) of phosphorus trichloride was heated with stirring to 50° C. at which point hydrogen chloride was evolved and the reaction proceeded exothermically. The reaction temperature was maintained below 60° C. When the evolution of hydrogen chloride had ceased, the reaction mixture was cooled to room temperature and thereafter dissolved in 50 cc. of water and filtered. The filtrate was rendered alkaline by adding 50% sodium hydroxide solution to the cooled solution. The product, 2-amino-5-ethyl-1,3,4-thiadiazole, precipitated from the alkaline solution, was filtered, washed with water and dried at 80° C. Melting point 188–193° C. Yield, 10.2 g. (79.2%).

EXAMPLE II

2-amino-5-vinyl-1,3,4-thiadiazole

A mixture of 65 g. (0.5 mole) of beta-chloro propionyl chloride, 39 g. (0.5 mole) of thiosemicarbazide and 27.1 g. (0.13 mole) of phosphorus pentachloride was prepared, heated with stirring to approximately 35° C. and thereafter maintained at a temperature below 60° C. until the evolution of hydrogen chloride had ceased. Thereafter, the reaction mixture was dissolved in approximately 400 cc. of warm 50% alcohol containing 50 g. of sodium hydroxide. The resulting mixture was refluxed for 3 hours, water was added, alcohol was distilled off and the residual mixture was cooled. The solid product which formed in the solution was filtered off, washed and dried. This material was 2-amino-5-vinyl-1,3,4-thiadiazole. In place of beta-chloro propionyl chloride, alpha-chloro propionyl chloride may be employed.

EXAMPLE III

2-amino-5-cyclopropyl-1,3,4-thiadiazole

A mixture of 22.9 g. (0.20 mole) of cyclopropyl carbonyl chloride, 18.2 g. (0.20 mole) of thiosemicarbazide and 11.9 g. (0.07 mole) of phosphorus oxychloride was prepared, heated with stirring to 50° C. and maintained at a temperature below 60° C. until the evolution of hydrogen chloride had ceased. Thereafter the reaction mixture was cooled to room temperature, dissolved in 250 cc. of water and filtered. The solution was rendered alkaline by slowly adding 50% sodium hydroxide solution to the cooled solution of reaction products and the material which precipitated in the solution was filtered off, washed with water and dried at 80° C. Melting point 210–211° C. (Corr.) Yield 77%.

EXAMPLE IV

2-amino-5-benzyl-1,3,4-thiadiazole

A mixture of 0.25 mole of phenylacetyl chloride, 0.25 mole of thiosemicarbazide and 0.10 mole of phosphorus tribromide was prepared and heated with stirring to 40–50° C. to initiate the reaction, as evidenced by the evolution of hydrogen chloride and hydrogen bromide. The reaction temperature was thereafter kept below 60° C. until the evolution of the hydrohalides had ceased. The reaction mixture was thereafter cooled in a water bath to room temperature, dissolved into 200 cc. of water and filtered. The filtrate was made alkaline by slowly adding 50% sodium hydroxide solution to the cooled filtrate. The solid material which precipitated was filtered off, washed with water and dried. The product was 2-amino-5-benzyl-1,3,4-thiadiazole.

EXAMPLE V

2-amino-5-propenyl-1,3,4-thiadiazole

A mixture of 37 g. (0.35 mole) of crotonyl chloride, 32.2 g. (0.35 mole) of thiosemicarbazide and 47.6 g. (0.40 mole) of thionyl chloride was prepared, heated with stirring to 35° C. and maintained at a temperature below 60° C. until the evolution of hydrogen chloride had ceased. Thereafter the reaction mixture was cooled to room temperature, dissolved into 200 cc. of water and filtered. The filtrate was rendered alkaline with 50% sodium hydroxide solution. The solid material which separated from the solution was filtered off, washed and dried. The product was 2-amino-5-propenyl-1,3,4-thiadiazole.

EXAMPLE VI

2-amino-5-methyl-1,3,4-thiadiazole

A mixture of 39.3 g. (0.5 mole) of acetyl chloride, 45.7 g. (0.5 mole) of thiosemicarbazide and 38 g. (0.28 mole) of sulfur monochloride ($S_2Cl_2$) was prepared and warmed with stirring to 35° C. to start the reaction, and the reaction temperature was maintained below 60° C. until the evolution of hydrogen chloride had ceased. Thereafter the reaction mixture was cooled to room temperature, dissolved in 150 cc. of water and filtered. The filtrate was rendered alkaline with 50% sodium hydroxide solution. The solid material which precipitates on cooling the alkaline solution was filtered off, washed and dried. The product was 2-amino-5-methyl-1,3,4-thiadiazole.

EXAMPLE VII

2-amino-5-butyl-1,3,4-thiadiazole

A mixture of 36.2 g. (0.3 mole) of valeryl chloride, 27.4 g. (0.3 mole) of thiosemicarbazide and 38.5 g. (0.33 mole) chlorosulfonic acid was prepared and warmed with stirring to 40–50° C. to initiate the reaction, as evidenced by the evolution of hydrogen chloride. The reaction mixture was kept at a temperature below 60° C. until the evolution of hydrogen chloride had ceased. The reaction mixture was thereafter cooled in a water bath to room temperature, and carefully poured into 300 cc. of cold water. The reaction mixture solution was then cooled and filtered, the filtrate being made alkaline by carefully, with cooling, adding 35 cc. 50% sodium hydroxide solution. The solid material, which precipitated from the cooled alkaline solution, was filtered off, washed and dried, and was the product 2-amino-5-butyl-1,3,4-thiadiazole.

EXAMPLE VIII

2-amino-5-butenyl-1,3,4-thiadiazole

A mixture of 27.4 g. (0.3 mole) of thiosemicarbazide, 42.3 g. (0.3 mole) of alpha-chlorovaleryl chloride and 68.7 g. (0.33 mole) thionyl bromide was prepared and warmed with stirring to 50° C. Thereafter, the reaction temperature was kept below 60° C. until the evolution of hydrogen chloride and hydrogen bromide had ceased. The reaction mixture was then cooled and dissolved into 300 cc. of 50% alcohol containing 25 g. sodium hydroxide. The resulting mixture was refluxed for 3 hours, water added, the alcohol distilled off, and the residual mixture cooled. The solid product formed was filtered off, washed and dried. The material was 2-amino-5-butenyl-1,3,4-thiadiazole.

EXAMPLE IX

2-amino-5-propyl-1,3,4-thiadiazole

A mixture of 26.6 g. (0.25 mole) of butyryl chloride, 22.8 g. (0.25 mole) thiosemicarbazide and 33.6 g. (0.15 mole) of sulfur monobromide was prepared and warmed to 50° C. at which point hydrogen chloride and hydrogen bromide were evolved and the reaction proceeded exothermically. The reaction temperature was maintained below 60° C. When the evolution of the hydrohalides had ceased, the reaction mixture was cooled to room temperature and thereafter dissolved in 50 cc. of water and filtered. The filtrate was rendered alkaline by adding 50% sodium hydroxide solution to the cooled solution. The product, 2-amino-5-propyl-1,3,4-thiadiazole, was filtered, washed with water and dried at 80° C.

In the practice of the process of the present invention in order to obtain the maximum beneficial result in the increased yield of the desired product, it is necessary to employ at least one equivalent of one of the described condensing agents for each equivalent of thiosemicarbazide.

Moreover, it is also necessary in order to obtain the best yields, to employ equivalent proportions of the acyl chloride and thiosemicarbazide. Variations from these proportions may be practiced; however, in each instance it has been found that the best yields and the greatest improvements in yield over the prior art processes are obtained when the aforescribed proportions are employed. It is further construed as being within the scope of the present invention that more than one equivalent of one of the herein described condensing agents for each mole of thiosemicarbazide may be employed. However, it has been found that there is no further beneficial result to be derived from using more than one equivalent of the herein described condensing agents for each equivalent of thiosemicarbazide, except for the use of a moderate excess over this ratio to compensate for the possible depletion of the condensing agent in side reactions.

The term "acyl chloride" in the appended claims is defined as a compound composed of a radical selected from the group consisting of alkyl, alkenyl, aralkyl and cycloalkyl radicals linked through a carbon atom to the carbonyl chloride radical. The present application is a continuation-in-part of my co-pending application, Serial No. 602,934, filed July 2, 1945, now abandoned.

While the process of the present invention has been described and illustrated in the foregoing specification and examples, it is to be observed that the present invention is not to be construed as being limited in respect to any particular substances, proportions, conditions, or combinations except as defined in the claims.

I claim:

1. An improved method of making 2-amino-5-substituted-1,3,4-thiadiazoles in which the 5-position substituent is a radical selected from the group consisting of alkyl, alkenyl, aralkyl and cycloalkyl radicals comprising condensing one equivalent of an acyl chloride with one equivalent of thiosemicarbazide in the presence of at least one equivalent of at least one condensing agent selected from the group consisting of thionyl chloride, thionyl bromide, sulfur monochloride, sulfur monobromide, chlorosulfonic acid, chlorides of phosphorus, and bromides of phosphorus, rendering the mixture alkaline and recovering the 2 - amino - 5 - substituted - 1,3,4- thiadiazole from the reaction mixture.

2. An improved method of making 2-amino-5-substituted-1,3,4-thiadiazoles in which the 5-position substituent is a radical selected from the group consisting of alkyl, alkenyl, aralkyl, and cycloalkyl radicals comprising condensing one equivalent of an acyl chloride with one equivalent of thiosemicarbazide in the presence of at least one equivalent of phosphorus trichloride, rendering the mixture alkaline and recovering the 2-amino-5-substituted-1,3,4-thiadiazole from the reaction mixture.

3. An improved method of making 2-amino-5-substituted-1,3,4-thiadiazoles in which the 5-position substituent is a radical selected from the group consisting of alkyl, alkenyl, aralkyl and cycloalkyl radicals comprising condensing one equivalent of an acyl chloride with one equivalent of thiosemicarbazide in the presence of at least one equivalent of thionyl chloride, rendering the mixture alkaline and recovering the 2-amino-5-substituted-1,3,4-thiadiazole from the reaction mixture.

4. An improved method of making 2-amino-5-substituted-1,3,4-thiadiazoles in which the 5-position substituent is a radical selected from the group consisting of alkyl, alkenyl, aralkyl and cycloalkyl radicals comprising condensing one equivalent of an acyl chloride with one equivalent of thiosemicarbazide in the presence of at least one equivalent of phosphorus oxychloride, rendering the reacted mixture alkaline and recovering the 2-amino-5-substituted-1,3,4-thiadiazole from the reaction mixture.

5. In the process of preparing 2-amino-5-substituted-1,3,4-thiadiazoles in which the 5-position substituent is a radical selected from the group consisting of alkyl, alkenyl, aralkyl and cycloalkyl radicals, the step comprising condensing one equivalent of an acyl chloride with one equivalent of thiosemicarbazide in the presence of at least one equivalent of at least one condensing agent selected from the group consisting of thionyl chloride, thionyl bromide, sulfur monochloride, sulfur monobromide, chlorosulfonic acid, chlorides of phosphorus, and bromides of phosphorus.

6. In the process of preparing 2-amino-5-substituted-1,3,4-thiadiazoles in which the 5-position substituent is a radical selected from the group consisting of alkyl, alkenyl, aralkyl and cycloalkyl radicals, the step comprising condensing one equivalent of an acyl chloride with one equivalent of thiosemicarbazide in the presence of at least one equivalent of phosphorus trichloride.

7. In the process of preparing 2-amino-5-substituted-1,3,4-thiadiazoles in which the 5-position substituent is a radical selected from the group consisting of alkyl, alkenyl, aralkyl and cycloalkyl radicals, the step comprising condensing one equivalent of an acyl chloride with one equivalent of thiosemicarbazide in the presence of at least one equivalent of phosphorus oxychloride.

8. In the process of preparing 2-amino-5-substituted-1,3,4-thiadiazoles in which the 5-position substituent is a radical selected from the group consisting of alkyl, alkenyl, aralkyl and cycloalkyl radicals, the step comprising condensing one equivalent of an acyl chloride with one equivalent of thiosemicarbazide in the presence of at least one equivalent of thionyl chloride.

9. An improved method of making 2-amino-5-ethyl-1,3,4-thiadiazole comprising condensing one equivalent of propionyl chloride with one equivalent of thiosemicarbazide in the presence of at least one equivalent of at least one condensing agent selected from the group consisting of thionyl chloride, thionyl bromide, sulfur monochloride, sulfur monobromide, chlorosulfonic acid, chlorides of phosphorus, and bromides of phosphorus, rendering the reacted mixture alkaline and recovering the 2-amino-5-ethyl-1,3,4-thiadiazole from the reaction mixture.

10. In the process of preparing 2-amino-5-ethyl-1,3,4-thiadiazole, the step comprising condensing one equivalent of propionyl chloride with one equivalent of thiosemicarbazide in the presence of at least one equivalent of at least one condensing agent selected from the group consisting of thionyl chloride, thionyl bromide, sulfur monochloride, sulfur monobromide, chlorosulfonic acid, chlorides of phosphorus, and bromides of phosphorus.

11. In the process of preparing 2-amino-5-ethyl-1,3,4-thiadiazole, the step comprising condensing one equivalent of propionyl chloride with one equivalent of thiosemicarbazide in the presence of at least one equivalent of phosphorus trichloride.

12. An improved method of making 2-amino-5-alkenyl-1,3,4-thiadiazoles comprising condensing one equivalent of a chloroalkanoyl chloride with one equivalent of thiosemicarbazide in the presence of at least one equivalent of at least one condensing agent selected from the group consisting of thionyl chloride, thionyl bromide, sulfur monochloride, sulfur monobromide, chlorosulfonic acid, and chlorides of phosphorus, and bromides of phosphorus, reacting the resulting 2-amino-5-chloralkyl-1,3,4 - thiadiazole hydrochloride with an alkaline hydrolyzing agent until hydrogen chloride has been removed from the compound and the free base has been liberated, and subsequently recovering the 2-amino-5-alkenyl-1,3,4-thiadiazole from the reaction mixture.

13. An improved method of making 2-amino-5-vinyl-1,3,4-thiadiazole comprising condensing one equivalent of beta-chloropropionyl chloride with one equivalent of thiosemicarbazide in the presence of at least one equivalent of at least one condensing agent selected from the group consisting of thionyl chloride, thionyl bromide, sulfur monochloride, sulfur monobromide, chlorosulfonic acid, chlorides of phosphorus, and bromides of phosphorus, reacting the resulting 2-amino-5-chloroethyl-1,3,4-thiadiazole hydrochloride with a hydrolyzing agent until the hydrogen chloride has been removed and the free base has been liberated, and subsequently recovering the 2-amino-5-vinyl-1,3,4-thiadiazole from the reaction mixture.

14. An improved method of making 2-amino-5-substituted-1,3,4-thiadiazoles in which the 5-position substituent is a radical selected from the group consisting of alkyl, alkenyl, aralkyl and cycloalkyl radicals comprising condensing one equivalent of an acyl chloride with one equivalent of thiosemicarbazide in the presence of at least one equivalent of at least one condensing agent selected from the group consisting of thionyl chloride, thionyl bromide, sulfur monochloride, sulfur monobromide, chlorosulfonic acid, chlorides of phosphorus, and bromides of phosphorus, and recovering the 2-amino-5-substituted-1,3,4-thiadiazole from the reaction mixture.

15. An improved method of making 2-amino-5-substituted-1,3,4-thiadiazoles in which the 5-position substituent is a radical selected from the group consisting of alkyl, alkenyl, aralkyl and cycloalkyl radicals comprising condensing one equivalent of an acyl chloride with one equivalent of thiosemicarbazide in the presence of at least one equivalent of phosphorus trichloride, and recovering the 2-amino-5-substituted-1,3,4-thiadiazole from the reaction mixture.

16. An improved method of making 2-amino-5-substituted-1,3,4-thiadiazoles in which the 5-position substituent is a radical selected from the group consisting of alkyl, alkenyl, aralkyl and cycloalkyl radicals comprising condensing one equivalent of an acyl chloride with one equivalent of thiosemicarbazide in the presence of at least one equivalent of thionyl chloride, and recovering the 2-amino-5-substituted-1,3,4-thiadiazole from the reaction mixture.

17. An improved method of making 2-amino-5-substituted-1,3,4-thiadiazoles in which the 5-position substituent is a radical selected from the group consisting of alkyl, alkenyl, aralkyl and cycloalkyl radicals comprising condensing one equivalent of an acyl chloride with one equivalent of thiosemicarbazide in the presence of at least one equivalent of phosphorus oxychloride, and recovering the 2-amino-5-substituted-1,3,4-thiadiazole from the reaction mixture.

18. In the process of preparing 2-amino-5-ethyl-1,3,4-thiadiazole, the step comprising condensing one equivalent of propionyl chloride with one equivalent of thiosemicarbazide in the presence of at least one equivalent of thionyl chloride.

19. In the process of preparing 2-amino-5-ethyl-1,3,4-thiadiazole, the step comprising condensing one equivalent of propionyl chloride with one equivalent of thiosemicarbazide in the presence of at least one equivalent of a phosphorus chloride.

GEORGE W. STEAHLY.

REFERENCES CITED

The following references are of record in the file of this patent:

UNITED STATES PATENTS

| Number | Name | Date |
|---|---|---|
| 998,772 | Hessenland | July 25, 1911 |

FOREIGN PATENTS

| Number | Country | Date |
|---|---|---|
| 503,700 | Great Britain | Apr. 12, 1939 |

OTHER REFERENCES

Berichte, vol. 29, pp. 2511–2517 (1896).
Chemical Abstracts, vol. 36, 70,094 (1942).

Certificate of Correction

Patent No. 2,497,825 February 14, 1950

GEORGE W. STEAHLY

It is hereby certified that error appears in the printed specification of the above numbered patent requiring correction as follows:

Column 4, lines 1 and 2, for "350 C." read $35°$ $C.$;

and that the said Letters Patent should be read with this correction therein that the same may conform to the record of the case in the Patent Office.

Signed and sealed this 6th day of June, A. D. 1950.

[SEAL]

THOMAS F. MURPHY,
*Assistant Commissioner of Patents.*